Oct. 11, 1960

A. G. PAUL 2,955,839

SCOOTER

Filed Sept. 22, 1958

INVENTOR.
Alex G. Paul
BY
Ooms, McDougall, Williams & Hersh
Attorneys

United States Patent Office 2,955,839
Patented Oct. 11, 1960

2,955,839
SCOOTER

Alex G. Paul, Elmwood Park, Ill., assignor to Radio Steel & Mfg. Co., Chicago, Ill., a corporation of Illinois Filed Sept. 22, 1958, Ser. No. 762,344

9 Claims. (Cl. 280—87.04)

This invention relates to a scooter pedal frame and more particularly to the attachment of the load bearing portion of the pedal frame to the pedal frame bracket.

The pedal frame of a scooter comprises a load bearing or foot receiving member and a bracket member for pivotally connecting the pedal frame to the front fork of the scooter so the scooter can be steered. The load bearing member is usually a channel shaped metal bar for reasons of strength and economy, and the pedal frame bracket is also generally channel shaped. The pedal frame bracket includes spaced parallel upper and lower bearing plates. These bearing plates are generally perpendicular to the web of the bracket member, and are adapted to be in coextensive engagement with bearing plates secured to the front fork of the scooter. A pivot pin extends through aligned openings in all the bearing plates and provides the required pivotal connection between the pedal frame and the front fork.

Heretofore the pedal frame bracket was riveted or welded to the end of the load bearing channel shaped portion of the pedal frame. This procedure was expensive from a manufacturing standpoint because of the labor and machinery required. In addition, the resulting connection could not be made sufficiently strong and safe for long periods of use without making the cost of the scooter economically prohibitive.

Investigations have shown that connections formed by interlocking the flanges of the pedal frame members together may provide an economically feasible alternative to existing procedures. The reasons for this are the greater simplicity of the tools required and the decrease in time required to form the connection. The decrease in time is very important because it substantially reduces labor costs. Furthermore, the resulting connection will be stronger and consequently much safer than connections formed by existing procedures.

What is needed, therefore, and comprises the principal object of this invention is a pedal frame in which the pedal frame bracket and the load bearing channel shaped portion of the pedal frame are connected together by folding and interlocking their flanged portions.

A further object of this invention is to provide a simple and economical method for rigidly connecting a channel shaped load bearing member to a channel shaped bracket.

These and other objects of this invention will become more apparent when read in the light of the accompanying specification and drawing wherein—

Figure 1:
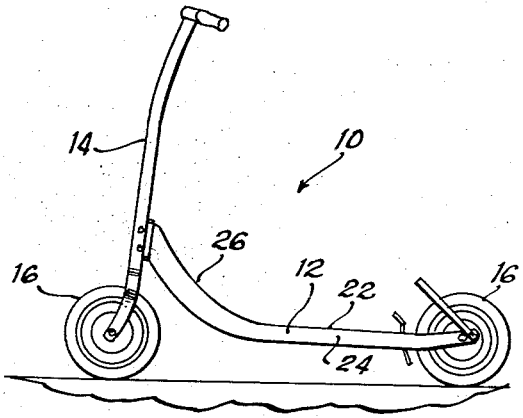
Figure 1 is a side elevational view of a scooter constructed according to the principles of this invention.
Figure 4:
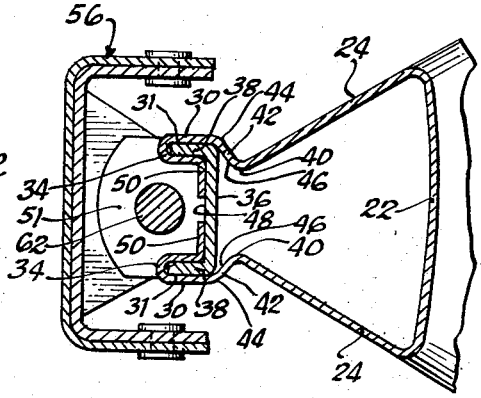
Figure 4 is a sectional view taken on the line 4—4 of Figure 3 and looking in the direction indicated.

Referring now to Figure 1 of the drawing, a scooter indicated generally by the reference numeral 10 comprises a pedal frame 12, a front steering fork 14, and wheels 16. The pedal frame includes a load bearing or foot receiving portion 18 and a pedal frame bracket 20, see Figure 2. The load bearing portion of the pedal frame is formed of a unitary piece of sheet material, usually metal for reasons of strength and economy, and includes a web 22 with opposed sides. These sides are bent downwardly substantially perpendicular to the web to form elongated opposed pedal frame flanges 24, see Figure 4. An end portion 26 of the web 22 is curved upwardly, see Figure 1, and as seen in Figure 4, the sides of this end portion of the web converge for reasons to become apparent below.

Figure 2:
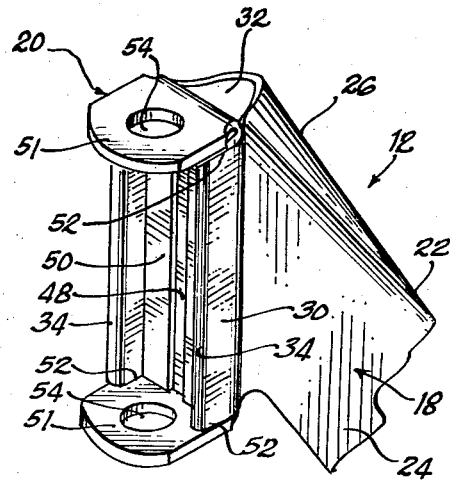
Figure 2 is a perspective view of the front portion of the pedal frame showing the pedal frame bracket connected to the flanges of the load bearing channel shaped member.

The end portions 30 of the pedal frame flanges 24 are separated from the web 22 by the opening 32, see Figure 2, to permit the end portions of the flanges to be folded on a line 34 which is perpendicular to the direction of the extension of the flanges. As seen in Figure 2, the direction of this extension of the flange end portions 30 is inclined to the direction of extension of the remaining portions of flanges 24 so the bracket member 20, when attached to the load bearing member 18 will be in position to be connected to the fork 14 of the scooter 10, as described below.

The pedal frame bracket 20 is also formed from a unitary piece of sheet material, usually metal, and includes a bracket web 36 with opposed sides. The side edges of the bracket 20 are bent substantially perpendicular to the web 36 to form bracket flanges 38, see Figure 4.

As seen, the flanges 24 of the load bearing member which are secured to the converging sides of the end portion 26 of web 22 converge at 40 where they are separated from each other by a distance less than the width of the web 36 of the bracket. Then these flanges diverge at 42 and are bent at 44 to form the above described flange end portions 30. The portions of flanges 24 at 40 and 42 form a seat 46 for a web 36 of the bracket 20. The separation of the portions 44 of the flanges 24 is substantially equal to the width of the web 36 of bracket 20, and the flange end portions 30 are bent so they are parallel to flanges 38 when the bracket 20 engages seat 46. With this arrangement, the opposed side flanges 38 of bracket 20 will be at least closely adjacent to the facing surfaces 31 of the end portions 30 of the flanges 24.

As seen in Figure 4, flange end portions 30 are bent substantially 180° on line 34 around the extreme ends of the flange 38 and then they are clinched together until they tightly embrace the bracket flanges 38. The extreme end portions 50 of the flange end portions 30 extend back toward the inner surface 48 of web 36 and are folded into engagement with it. This arrangement which causes the web 36 of the bracket 20 to be tightly held between seat 46 and the extreme ends 50 of the flange portions 30 further helps to lock the members of the pedal frame together.

Figure 3:
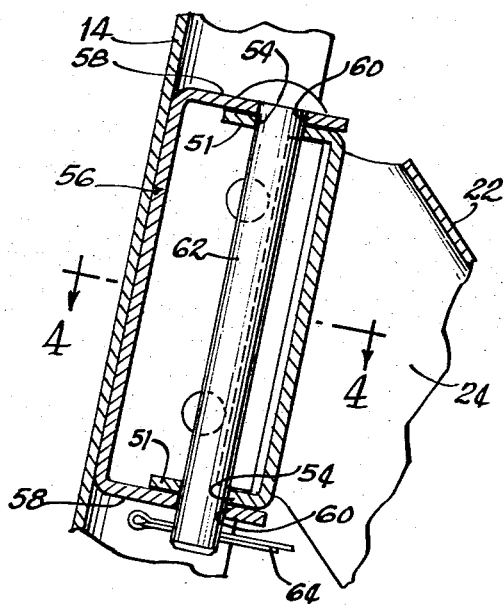
Figure 3 is a sectional view showing the connection of the pedal frame to the front fork of the scooter.

To prevent the bracket flanges 38 from sliding in the folded end portions 30 of the flanges 24 of the load bearing member 18, the opposed ends 51 of the bracket member web 36 are separated from the bracket flanges 38 and are bent toward each other until they are substantially perpendicular to the plane of the web portions 36 and to the planes of the facing surfaces of flanges 38, see Figure 3. The spacing between ends 51 is such that in this bent position, they will be closed adjacent to or abut against the opposite ends 52 of the folded end portions 30 of the load bearing members 18 and the ends of the bracket flanges 38. This prevents the flanges 38 from sliding in the folded end portion flanges 30. The ends 51 of the bracket member are provided with aligned shaft receiving openings 54, see Figure 2, so that they have two functions, one as an abutment member as described above, and another as a bearing member for a shaft, so that they may be referred to as combined abutment and bearing members.

As seen in Figure 3, a bracket 56 is rigidly secured to the front fork 14 by any conventional means. This bracket is provided with spaced parallel bearing members 58 which includes aligned shaft receiving openings 60. When the front fork 14 is properly positioned for attachment to the pedal frame, the bearing members 58 will overlie the combined bearing and abutment members 51 and the shaft receiving openings 54 and 60 will be in alignment with each other. Then to pivotally lock the front fork 14 and the pedal frame 12 together, a pivot shaft or pin 62 is simply inserted through these aligned openings and is held in place by means of the other pin 64.

The invention may be embodied in other forms without departing from the spirit or essential characteristics thereof as set forth in the claims, and the present embodiment is therefore to be considered as illustrative and not restrictive, and it is intended to include all changes which come within the scope and range of the claims.

I claim:

1. An apparatus of the class described comprising in combination, a first and second member formed of sheet material, each member including a web portion with opposed side edges, the side edges of the web portion of at least the first member rigidly secured to elongated opposed side flanges, at least one end portion of the side flanges of the first member separated from the web portion in such a way that the said end portion of these flanges can be folded on a line perpendicular to the direction of their extension, and at least a portion of the said end portion of the said flanges of the first member parallel to and separated from each other by a distance substantially equal to the width of at least a portion of the web of the second member, the side edges of said portion of said second member positioned closely adjacent to the end portions of the flanges of the first member, the said end portions of the flanges of the first member folded on said line to tightly embrace opposite surfaces on the second member, and at least one abutment member secured to at least one of said members and adapted to abut against at least one end of the folded flanges of the first member to prevent said second member from sliding in the folded flanges of the first member.

2. An apparatus of the class described comprising in combination, a load supporting member and a bracket member, both of said members formed of sheet material and including a web portion with opposed side edges, the side edges of the web portions rigidly secured to elongated opposed side flanges, at least one end portion of the side flanges of the load supporting member separated from the web portion in such a way that the said end portion of each of these flanges can be folded on a line perpendicular to the direction of its extension, and at least a portion of the said end portion of the side flanges of the load supporting member parallel to and separated from each other by a distance substantially equal to the width of at least a portion of the web of the bracket member, said portion of said bracket member positioned with its opposed side flanges adjacent to the end portions of the flanges of the load supporting member, the extreme ends of the said end portions of the flanges of the load supporting member folded on said line to tightly embrace the opposite surfaces of the flanges of the bracket member, and abutment members on the opposite ends of said bracket member, said abutment members adapted to abut against the opposite ends of the folded flanges of the load supporting member to prevent the flanges of said bracket from sliding in the folded flanges of the load supporting member.

3. An apparatus of the class described comprising in combination, a load supporting member and a bracket member, both of said members formed of a unitary piece of sheet material and including a web portion with opposed side edges, the side edges of the web portions bent to form elongated opposed side flanges, at least one end portion of the side flanges of the load supporting member separated from the web portion in such a way that the said end portion of these flanges can be folded on a line perpendicular to the direction of its extension, and at least a portion of the said end portion of the side flanges or the load supporting member separated from each other by a distance substantially equal to the width of at least a portion of the web of the bracket member, said portion of said bracket member positioned with its opposed side flanges adjacent to the facing surfaces of the end portions of the flanges of the load supporting member, the extreme ends of the said end portions of the flanges of the load supporting member folded on said line to tightly embrace the opposite surfaces of the flanges of the bracket member, and the opposite ends of the web portion of said bracket member separated from the bracket flanges in such a way that the said ends of the web portion can be bent toward each other to form combined abutment and bearing members, said combined abutment and bearing members adapted to abut against the opposite ends of the folded flanges of the load supporting member to prevent the flanges of said bracket from sliding in the folded flanges of the load supporting member, and a shaft receiving opening in each of the combined abutment and bearing members, said openings aligned with each other for receiving an elongated shaft.

4. An apparatus of the class described comprising in combination, a load supporting member and a bracket member, each of said members formed of unitary pieces of sheet material and including a web portion with opposed side edges, the side edges of the web portions bent to form elongated opposed side flanges, at least one end of the side flanges of the load supporting member parallel to and separated from the web portion in such a way that the said end portion of these flanges can be folded on a line perpendicular to the direction of its extension, at least a part of the said end portion of the side flanges of the load supporting member separated from each other by a distance less than the width of at least a portion of the web of the bracket member, said part including a diverging portion wherein the flanges form a seat for the web of the bracket, said diverging portions of the side flanges of the load supporting member terminating in a bent portion, the separation of the said bent portions of the side flanges substantially equal to the width of the said portion of the web of the bracket member engaging said seat whereby the opposed side flanges of the bracket will be adjacent to the facing surfaces of the bent portions of the flanges of the load supporting member, the ends of said bent portion of the side flanges of the load supporting member folded on said line around the extreme ends of the flanges of the bracket member to tightly embrace said bracket flanges and thereby hold the bracket member and the load supporting member together.

5. The apparatus set forth in claim 4 wherein the said ends of the bent portions of the flanges of the load supporting member bent around the extreme ends of the bracket flange extend back toward the inner surface of the web of the bracket and are folded parallel to the bracket web and in engagement therewith to tightly hold the web of the bracket member between the said seat and the said extreme ends of the load supporting member.

6. The apparatus set forth in claim 4 wherein the opposite ends of the web portion of said bracket member are separated from the bracket flanges in such a way that the said ends of the bracket web portion can be bent toward each other to form combined abutment and bearing members, said combined abutment and bearing members adapted to abut against the opposite ends of the folded flanges of the load supporting member to prevent the flanges of said bracket from sliding in the folded flanges of the load supporting member, and a shaft receiving opening in each of the combined abutment and bearing members, said openings aligned with each other for receiving an elongated shaft.

7. A pedal frame for a scooter comprising in combination, a unitary piece of sheet material having a web with opposed sides, the side edges of the web bent downwardly substantially perpendicular to the web to form elongated opposed pedal frame flanges, an end portion of said web bent upwardly, said upwardly bent end portion having converging sides, at least the pedal frame flanges adjacent said upwardly bent converging web portion separated from the web in such a way that the adjacent end portion of these pedal frame flanges can be folded on a line perpendicular to the direction of their extension, and a bracket, said bracket formed of a unitary piece of sheet material and including a bracket web with opposed sides, the side edges of said bracket web bent substantially perpendicular to form bracket flanges, at least a part of the pedal frame flanges adjacent the converging upwardly bent end of the web separated from each other by a distance less than the width of at least a portion of the web of the bracket member, said part including a portion wherein the pedal frame flanges diverge from each other to form a seat for the web of the bracket, said diverging portions of the pedal frame flanges terminating in a portion which is bent parallel to the flanges of said bracket member when the said portion of said bracket member engages said seat, the separation of the said bent part of the diverging portions of the pedal frame flanges substantially equal to the width of the said portion of the web of the bracket member engaging said seat whereby the opposed side flanges of the bracket will be parallel and closely adjacent to the facing surfaces of the end portions of the pedal frame flanges, the ends of said pedal frame flanges beyond the said bend folded on said line around the extreme ends of the flanges of the bracket member to tightly embrace said bracket flanges and thereby hold the parts of the pedal frame together.

8. The apparatus set forth in claim 7 wherein the opposite ends of the web portion of said bracket member are separated from the bracket flanges in such a way that the said ends of the bracket web portion can be bent perpendicular to said web portion to form combined abutment and bearing members, said combined abutment and bearing members abutting against the opposite ends of the folded pedal frame flanges to prevent the flanges of the bracket from sliding in the folded pedal frame flanges, and a shaft receiving opening in each of the combined abutment and bearing members, said openings aligned with each other for receiving an elongated shaft.

9. The apparatus set forth in claim 8 wherein said elongated shaft is a pin and said bracket abutment and bearing members are adapted to lie against bracket members secured to the front fork of the scooter, said pin adapted to extend through openings in both the bracket abutment and bearing members and the bracket members secured to the front fork of the scooter to pivotally connect the pedal frame to the front fork of the scooter so it can be steered.

References Cited in the file of this patent

UNITED STATES PATENTS

| | | |
|---|---|---|
| 2,378,961 | Wallace et al. | June 26, 1945 |
| 2,460,395 | Reid | Feb. 1, 1949 |